Aug. 7, 1945. E. H. MARKWART ET AL 2,381,221
PUMP CONTROL AND THE LIKE
Filed Oct. 4, 1943 2 Sheets-Sheet 2
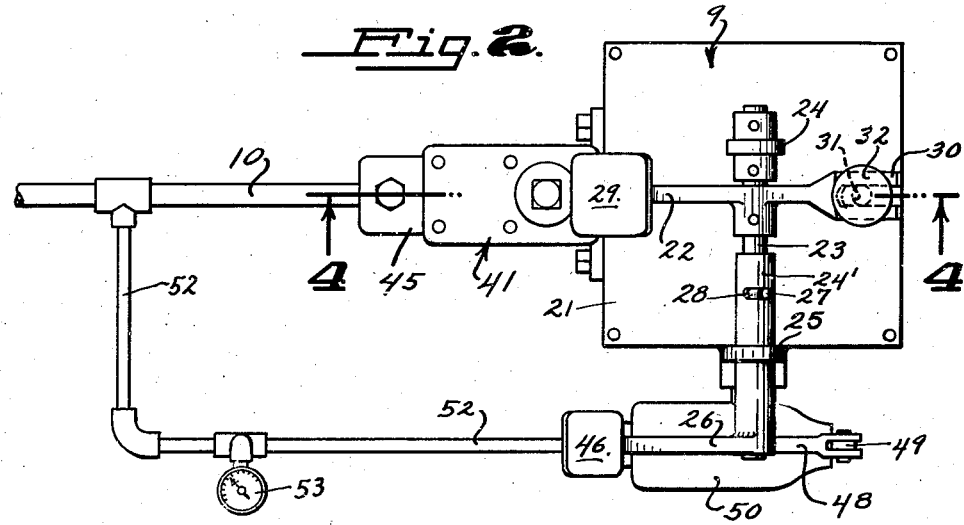
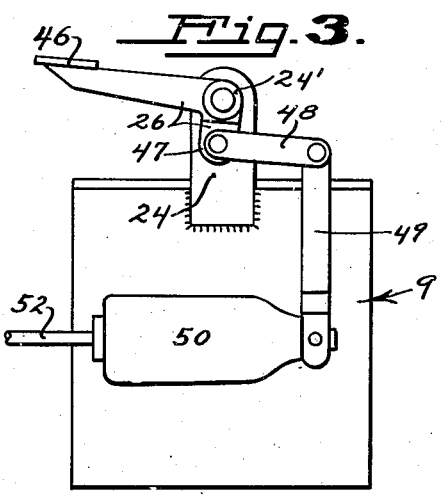
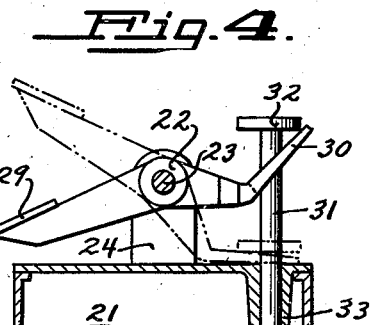
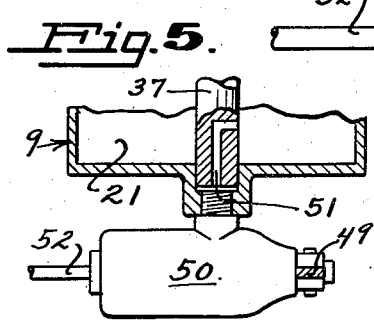
INVENTORS,
EARL H. MARKWART.
ALBERT L. CANNON.
BY Chas. E. Townsend
ATTORNEY Patented Aug. 7, 1945

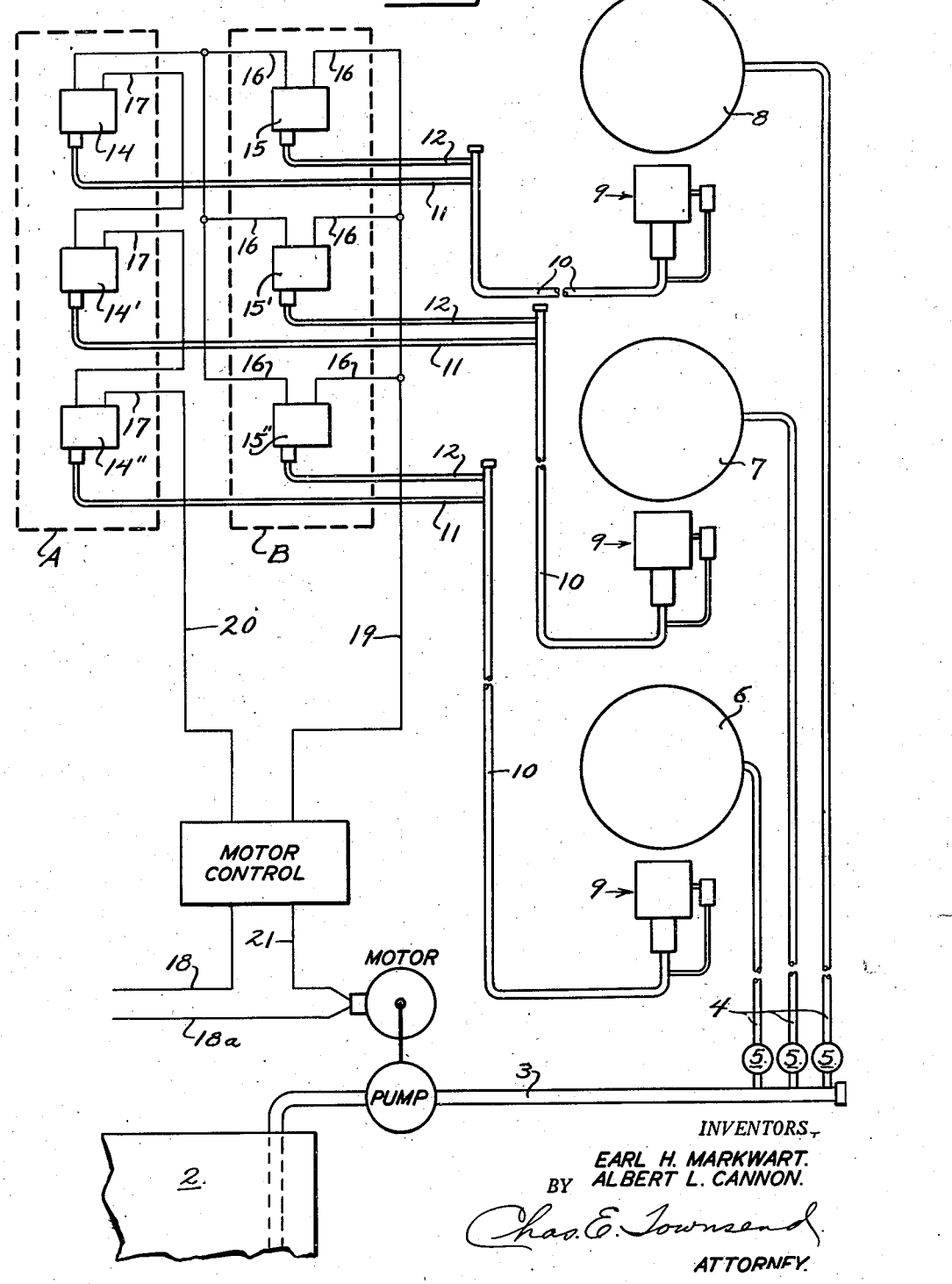

2,381,221

UNITED STATES PATENT OFFICE 2,381,221

PUMP CONTROL AND THE LIKE

Earl H. Markwart and Albert L. Cannon, Sacramento, Calif.; said Cannon assignor to said Markwart, doing business as Yuba Tank & Steel Co., Sacramento, Calif.

Application October 4, 1943, Serial No. 504,898

6 Claims. (Cl. 103—11)

This invention relates to control means for pumps and the like, and more particularly to a means for controlling gasoline pumps from a point remote therefrom.

At air fields and the like, gasoline storage pits are usually thousands of yards removed from one another and the dispersal tank from which gasoline is being pumped. The pump, usually adjacent the tank, should be controlled preferably as to each pit from the locus of the pit. For example, if a fire breaks out in one gasoline storage pit, the entire depot is endangered unless the control of the gasoline pump is made accessible to the operators stationed at each pit.

During war bombardment it is preferable to have a control system which is not dependent upon a delicate balance of complicated electrical apparatus. The present invention, among other things, is designed to overcome the problem of fragility inherent in prior control apparatus.

The object of my invention is to provide an apparatus for controlling gasoline pumps and the like from points remote therefrom. Further objects of my invention are to provide control means for pump motors and the like adapted to be operated from each of a plurality of gasoline storage pits or the like; to provide means to control a pump motor or the like selectively from each of a plurality of gasoline storage pits or the like; to provide an emergency control for pump motors and the like which may be actuated from each of a plurality of gasoline storage pits or the like; to provide a sturdy, durable control means for pump motors and the like which is simple and positive of operation; to provide a control means for pump motors and the like which is simple and inexpensive of manufacture, assembly and installation and which affords a greater degree of flexibility of control than heretofore known. Other objects and advantages of the invention will become apparent upon reference to the accompanying specifications and drawings attached hereto and made a part hereof.

With reference to the drawings, in which similar characters of reference represent corresponding parts in the several views:

Fig. 1 is a chart and circuit diagram of the invention as applied to a gasoline depot.

Fig. 2 is a top plan view of a control box.

Fig. 3 is a side elevational view of a pit control box.

Fig. 4 is a vertical sectional view taken on line 4—4 of Fig. 2.

Fig. 5 is a fragmentary horizontal sectional view taken through one side of the pit control box.

In Fig. 1, the invention is shown as applied to a gasoline storage depot, wherein is shown a gasoline tank 2 and gasoline pipe 3 leading therefrom and operably connected to a pump and pump motor, as indicated. Pipe 3 leads to a plurality of branch pipes 4, provided with shut-off valves 5. The branch pipes 4 lead to three gasoline storage pits 6, 7 and 8. The gasoline tank may be a tank car or other supply source utilized as a source to fill the pits. It is here noted that the tank and adjacent pump and motor and the pits may all be located great distances from one another, as they usually are in practical installations.

Adjacent to each pit is a control box, generally indicated at 9, provided with fluid conduits 10 leading therefrom and connected into branch fluid conduits 11 and 12. Branch conduits 11 lead to and are connected to pressure control switches 14, 14' and 14" in dotted line panel A; and branch conduits 12 lead to and are connected to pressure control switches 15, 15' and 15" on dotted line panel B. The switches referred to are of a conventional type which open or close in response to increase or decrease of fluid pressure in lines 11 or 12. Switches 15, 15' and 15" will hereinafter be referred to as high pressure switches and the switches 14, 14' and 14" will be referred to as low pressure switches.

It is noted that the high pressure switches are connected by leads 16 in parallel with one another. The low pressure switches are all connected by leads 17 in series with one another.

It is also to be noted that one side 19 of the motor control circuit which leads to a conventional motor control is connected into each of the switches 15, 15' and 15" which are connected in parallel with one another. The other side 20 of the motor control circuit which is connected into the said motor control leads through the low pressure switches 14, 14' and 14" which are all connected in series with one another. As long as any one of the high pressure switches is closed and all of the low pressure switches are closed, the motor control circuit is closed. If, however, one of the low pressure switches is opened, the motor control circuit is broken. The motor control is connected to a conventional pump motor by line 21 and to source lead 18. Source lead 18a leads to the motor. The motor is, in turn, suitably connected to the pump.

A pit control box will now be described. A pit control box 9 is preferably located adjacent to each of the gasoline storage pits, and comprises a housing 21 forming a reservoir and is provided with a stepped lever control 22 which is medially keyed to a rotatable shaft 23 carried by bearing stud 24 atop the control box 9. The shaft 23 fits coaxially within sleeve 24' and is rotatable with respect thereto. The sleeve is rotatably mounted in bearing stud 25 carried atop the control box and bell crank 26, hereafter described, is keyed to said sleeve. A lug 27 attached to the shaft and projected from the outer periphery thereof is in registery with a slot 28 provided in said sleeve in order to restrain the relative rotation of the sleeve and shaft to an operative arc of approximately 90°. The pedal end of the lever 22 is designated at 29 and the opposite end 30 is forked to slidably engage with a push pin 31 having a head 32 and which projects vertically into the reservoir through a guideway 33 provided in the control box top.

When the pin 31 is depressed into the reservoir by applying a downward pressure, as by stepping on the head 32 to bring it to the dotted line position shown in Fig. 4 and which moves the lever 22 to the dotted line position shown in Fig. 4, the beveled bottom end 34 of the pin forces arm 35 of bell crank 36 into the dotted line position shown in Fig. 4 and the said bell crank is locked in such position by the pin 31 as long as the said pin remains in depressed position. (See the dotted line position in Fig. 4.) The bell crank 36 is pivotally mounted to a shaft 37. The short bell crank arm 38 is pivotally connected to plunger 39 which is coaxially aligned with and extends into aperture 40 which leads to a cylinder, generally indicated at 41. The cylinder 41 is equipped with a conventional spring-actuated control valve and plunger head apparatus, generally indicated at 42, as is used in automotive hydraulic braking devices.

It is here noted that the reservoir 21 is filled with a suitable fluid, such as oil, or, preferably, a non-expansible, non-contractible fluid, as are fluid conduits 10 and branch conduits 11 and 12. Hence, when pin 31 is depressed, plunger 39 is thrust into cylinder 41, forcing fluid into conduit 10. The plunger 39 is locked in the cylinder, as aforementioned, and the pressure which is built up thereby is maintained in the conduit 10 and the branch conduits 11 and 12. Upon retraction of the pin 31 to its full line position (Fig. 4), accomplished by depressing the pedal portion of lever 22, which moves the said lever to its full line position (Fig. 4) and retracts the pin, the spring 43 in cylinder 41 forces the plunger 39 and the bell crank 36 back to the full line position thereby relieving the pressure in line 10 and branch conduits 11 and 12 by allowing the fluid to bleed back therefrom into the reservoir. However, the check valve, indicated generally at 44, is set so that a predetermined low pressure will be maintained in line 10 and associated branches. This is accomplished by the tension of the coil spring 43 abutting against check valve 44 which is adapted to be of such strength as to close the check valve 44 when there is, say, only five pounds of pressure remaining in line 10. The housing 45 has been here illustrated as a part of a standard hydraulic cylinder of the character herein described.

For purposes of example, it is assumed that the pressure in line 10 and associated branches is jumped to twenty pounds when the pin 31 is depressed, forcing the plunger 39 into the cylinder 41. When the plunger and its associated mechanism are released, the pressure in line 10 and associated branches is relieved to five pounds, at which time the spring 43 closes check valve 44 and maintains a constant low pressure of five pounds in the said conduits.

Hence it is seen from the above, that when the plunger 39 is forced into the cylinder 41, building up a high pressure in conduit 10 to, say, twenty pounds and the branch conduit 12, the high pressure switch connected thereto is thereby closed. It is noted that the high pressure switches may be set so that they will close at a predetermined fluid pressure, and it is here assumed, for example, that they are set to close at twenty pounds of applied fluid pressure. The low pressure switches are assumed here to be set to close at, say, five pounds of applied fluid pressure. Consequently when the high pressure is in conduit 10 and connected branches, the low and high pressure switches are closed and the motor control circuit is closed starting the pump motor and the gasoline pump. When one or more of the pit control mechanisms are operated to put high pressure in a conduit or conduits 10, the motor control circuit is closed and the pump operates. If, however, any one of the low pressure switches is opened, the motor control circuit is thereby opened.

We have provided emergency low pressure relief means in each of the pit control boxes to bleed off the low pressure five pounds, previously set out as an example, in order to open immediately a low pressure switch and thereby break the motor control circuit and stop the motor and pump.

As herein illustrated, we provide a bell crank 26 which is keyed to rotatable sleeve 24' atop the pit control box. The longer arm of the bell crank is a pedal control 46. The short arm 47 is pivotally connected to a link 48 which, in turn, is pivotally connected to an arm 49 pivotally connected to one end of a valve 50. The valve 50 comprises a diaphragm or other conventional means adapted to be actuated by the movement of the arm 49 upon movement of control pedal 46. The connection in detail from arm 49 to valve mechanism 50 is not here shown as it is of conventional design. The valve 50 is mounted to the shaft 37 at one side of the pit control box. The shaft 37 is bored, as at 51, to provide access from the interior of the reservoir to the valve 50. Access through the said port 51 is controlled by the valve 50 which is actuated by the arm 49 through movement of pedal 46 and associated link. A conduit 52 leads from conduit 10 into valve 50 and is hereinafter referred to as the emergency low pressure conduit.

It is preferred to provide a pressure dial 53 in said emergency low pressure conduit 52 in order to be apprised of the pressure maintained therein. In the event a fire or some other emergency occurs and it is desired to open the motor control circuit, the operator simply moves the pedal control downwardly from the full line position shown in Fig. 3 which, in turn, causes arm 49 to open the valve 50 which allows communication between the port 51 and the conduit 52. In this manner the low pressure in conduit 10 is bled off through the port 51 into the reservoir 21, thereby relieving the pressure in branch conduit 11 and opening the connected low pressure switch which in turn breaks the motor control circuit.

It is contemplated that the cylinder 41, valve 50, conduit 52 or equivalent, and associated mechanism, except control levers, may be housed within the pit control box in order to facilitate assembly and improve the exterior design.

While we have described the invention in some detail of construction, use and installation, it is understood that the invention is not limited thereby, but is only limited by the spirit of the invention as defined by the appended claims.

We claim:

1. In a control system of the class described, the combination comprising a fluid supply reservoir, conduit means leading from said supply reservoir to a point of utilization remote from said supply reservoir, a motor driven pump for pumping fluid through said conduit means, and control means for said motor driven pump, said control means comprising an operating circuit connected to said motor driven pump, a low pressure-actuable switch and a high pressure-actuable switch in said operating circuit, fluid carrying control conduit means leading from said switches to a control point adjacent said point of utilization, means for normally maintaining a stand-by pressure in said control conduit means sufficient to close said low pressure-actuable switch and insufficient to close said high pressure-actuable switch, manually operable means at said control point arranged and adapted to increase the pressure in said control conduit means to a pressure sufficient to close said high pressure-actuable switch and manually operable means at said control point operative to decrease the pressure in said control conduit below the pressure required to close said low pressure-actuable switch.

2. In a control system of the class described, the combination comprising a fluid supply reservoir, conduit means leading from said supply reservoir to a plurality of points of utilization remote from said supply reservoir, a motor driven pump for pumping fluid through said conduit means from said supply reservoir, and control means for said motor driven pump, said control means comprising an operating circuit connected to said motor driven pump, a plurality of low pressure-actuable switches and a plurality of high pressure-actuable switches in said operating circuit, said low pressure-actuable switches being connected in said circuit in series and said high pressure-actuable switches being connected in said circuit in parallel, fluid carrying control conduit means leading from each pair of high and low pressure actuable switches to control points adjacent said points of utilization, means for normally maintaining a stand-by pressure in said control conduit means sufficient to maintain said low pressure-actuable switches in closed position and insufficient to close said high pressure-actuable switches, manually operable means at each of said control points arranged and adapted to increase the pressure in said control conduit means to a pressure sufficient to close one of said parallel-connected high pressure-actuable switches and thereby operate said motor driven pump and manually operable means at each of said control points operative to decrease the pressure in said control conduit means to a pressure whereat one of said series-connected low pressure-actuable switches is opened, thereby breaking said operating circuit and stopping operation of said motor driven pump.

3. In a control system of the class described, the combination comprising a fluid supply reservoir, conduit means leading from said supply reservoir to a plurality of points of utilization remote from said supply reservoir, a motor driven pump for pumping fluid through said conduit means from said supply reservoir, and control means for said motor driven pump, said control means comprising an operating circuit connected to said motor driven pump, a plurality of low pressure-actuable switches and a plurality of high pressure-actuable switches in said operating circuit, said low pressure-actuable switches being connected in said circuit in series and said high pressure-actuable switches being connected in said circuit in parallel, fluid carrying control conduit means leading from each pair of high and low pressure-actuable switches to control points adjacent said points of utilization, a manually operable hydraulic piston at each of said control points in flow communication with said control conduit means, said hydraulic pistons being operable to increase the pressure in said control conduit means to a pressure sufficient to close one of said parallel-connected high pressure-actuable switches, means for normally maintaining a pressure in said control conduit means sufficient to maintain said low pressure-actuable switches in closed position and insufficient to close said high pressure-actuable switches and manually operable means at each of said control points operative to decrease the pressure in said control conduit means to a pressure whereat one of said series-connected low pressure-actuable switches is opened.

4. In a control system of the class described, the combination comprising a fluid supply reservoir, conduit means leading from said supply reservoir to a plurality of points of utilization remote from said supply reservoir, a motor driven pump for pumping fluid through said conduit means from said supply reservioir, and control means for said motor driven pump, said control means comprising an operating circuit connected to said motor driven pump, a plurality of low pressure-actuable switches and a plurality of high pressure-actuable switches in said operating circuit, said low pressure-actuable switches being connected in said circuit in series and said high pressure-actuable switches being connected in said circuit in parallel, fluid carrying control conduit means leading from each pair of high and low pressure-actuable switches to control points adjacent said points of utilization, a manually operable hydraulic piston at each of said control points in flow communication with said control conduit means, said hydraulic pistons being operable to increase the pressure in said control conduit means to a pressure sufficient to close one of said parallel-connected high pressure-actuable switches, a check-valve in said control conduit means on the high pressure side of each of said hydraulic pistons operable to normally maintain a pressure in said control conduit means sufficient to maintain said low pressure-actuable switches in closed position and insufficient to close said high pressure-actuable switches, a fluid reservoir in flow communication with each of said hydraulic pistons, a by-pass conduit extending in flow communication from said fluid reservoirs to said control conduit means and around said check valve and a manually operable valve in each of said by-pass conduits whereby the pressure in said control conduit means may be reduced to a pressure whereat one of said series-connected low pressure-actuable switches is opened.

5. In a control system of the class described, the combination comprising an actuating circuit, a plurality of low pressure-operable switches series-connected in said actuating circuit, a plurality of high pressure-actuable switches parallel-connected in said actuating circuit, control conduit means leading from each pair of said high and low pressure-actuable switches to remote control points, means for normally maintaining a pressure in said control conduit means sufficient to close said low pressure-actuable switches, and insufficient to close said high pressure-actuable switches, manually operable means at each of said remote control points arranged and adapted to increase the pressure in said control conduit means to a pressure sufficient to close one of said high pressure-actuable switches, and manually operable means at each of said remote control points arranged and adapted to decrease the pressure in said control conduit means to a pressure whereat one of said low pressure-actuable switches is opened.

6. In a control system of the class described, the combination comprising an actuating circuit, a plurality of low pressure-operable switches series-connected in said actuating circuit, a plurality of high pressure-actuable switches parallel-connected in said actuating circuit, control conduit means leading from each pair of said high and low pressure-actuable switches to remote control points, means for normally maintaining a pressure in said control conduit means sufficient to close said low pressure-actuable switches and insufficient to close said high pressure-actuable switches, a manually operable hydraulic piston at each of said remote control points in flow communication with said control conduit means and adapted to increase the pressure in said control conduit means to a pressure sufficient to close one of said high pressure-actuable switches, a check valve on the high pressure side of each of said hydraulic pistons operable to normally maintain a pressure in said control conduit means sufficient to maintain said low pressure-actuable switches in closed position and insufficient to close said high pressure-actuable switches and manually operable pressure relief means at each of said remote control points operable to decrease the pressure in said control conduit means to a pressure whereat one of said low pressure-actuable switches is opened.

EARL H. MARKWART.
ALBERT L. CANNON.